United States Patent
Zhang et al.

(10) Patent No.: US 11,804,904 B1
(45) Date of Patent: Oct. 31, 2023

(54) SYSTEMS AND METHODS FOR OPTICAL WIRELESS COMMUNICATION

(71) Applicant: CABLE TELEVISION LABORATORIES, INC., Louisville, CO (US)

(72) Inventors: Haipeng Zhang, Broomfield, CO (US); Zhensheng Jia, Superior, CO (US); Junwen Zhang, Broomfield, CO (US); Mu Xu, Broomfield, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 62 days.

(21) Appl. No.: 17/384,403

(22) Filed: Jul. 23, 2021

Related U.S. Application Data

(60) Provisional application No. 63/055,366, filed on Jul. 23, 2020.

(51) Int. Cl.
*H04B 10/00* (2013.01)
*H04B 10/50* (2013.01)
*H04B 10/61* (2013.01)
*H04B 10/112* (2013.01)

(52) U.S. Cl.
CPC ....... *H04B 10/505* (2013.01); *H04B 10/1121* (2013.01); *H04B 10/614* (2013.01)

(58) Field of Classification Search
CPC ... H04B 10/11; H04B 10/112; H04B 10/1121; H04B 10/505; H04B 10/614; H04B 10/1123; H04B 10/1125; H04B 10/1127; H04B 10/1129; H04B 10/1143; H04B 10/1149; H04B 10/118; H04B 10/40; H04B 10/116

USPC ....... 398/118, 119, 120, 121, 122, 123, 124, 398/125, 126, 127, 128, 129, 130, 131, 398/135, 136, 137, 138, 139, 158, 159, 398/33, 38, 172, 183, 188, 202, 208, 209, 398/169, 170
See application file for complete search history.

(56) References Cited

U.S. PATENT DOCUMENTS

| | | | |
|---|---|---|---|
| 7,035,546 B2 * | 4/2006 | Keller | H04B 10/2587 378/170 |
| 7,486,893 B1 * | 2/2009 | Pepper | H04B 10/1125 398/118 |
| 10,763,961 B2 * | 9/2020 | Newell | G02B 6/4246 |
| 11,296,787 B2 * | 4/2022 | Cahoy | H04B 10/1129 |

(Continued)

*Primary Examiner* — Hanh Phan
(74) *Attorney, Agent, or Firm* — Josh C. Snider

(57) ABSTRACT

A beam steering subsystem is provided in an optical communication system. The beam steering subsystem is configured for steering a free-space optical (FSO) beam from a first transceiver to a second transceiver disposed remotely from the first receiver. The beam steering subsystem includes a beam steering device disposed between the first transceiver and the second transceiver, and an optical tracking unit in optical communication and electrical communication with the beam steering device. The wherein the beam steering device is further configured to (i) receive the FSO beam from the first transceiver, (ii) receive an optical tracking signal from the second transceiver, (iii) optically relay the received optical tracking signal to the optical tracking unit, and (iv) steer the FSO beam to the second transceiver based on an electrical feedback control signal from optical tracking unit.

21 Claims, 6 Drawing Sheets

(56) References Cited

U.S. PATENT DOCUMENTS

| | | | |
|---|---|---|---|
| 2014/0241731 A1* | 8/2014 | Peach | H04B 10/11 398/139 |
| 2017/0237498 A1* | 8/2017 | Essiambre | H04B 10/614 398/136 |
| 2018/0172915 A1* | 6/2018 | Kim | H04B 10/1129 |
| 2021/0250092 A1* | 8/2021 | Dickson | H04B 10/676 |

* cited by examiner

SYSTEMS AND METHODS FOR OPTICAL WIRELESS COMMUNICATION

CROSS REFERENCE TO RELATED APPLICATIONS

This application claims the benefit of and priority to U.S. Provisional Patent Application Ser. No. 63/055,366, filed Jul. 23, 2020, the subject matter thereof which is incorporated herein by reference in its entirety.

BACKGROUND

The field of the disclosure relates generally to communication networks, and more particularly, to access networks capable of digitally processing carrier signals for point-to-point (P2P) and point-to-multipoint (P2MP) communication systems.

The recent significant development, prevalence, and desirability of data-intensive applications and services, such as high-definition video-on-demand (VoD), cloud computing/storage, Internet of Things (IoT), and Big Data, has resulted in a continuously increasing demand for communication bandwidth for the growing levels of data traffic to and from residential and business communications/computing devices. This increasing ever-increasing is expected to require multi-gigabits per second (Gps) speeds for the average user in the very near future. Wireless communication technology, such as fifth generation (5G) radio frequency (RF) based wireless technologies, offer promising solutions to support this amount of bandwidth demand; however, the transmission speed of a 5G RF network is limited by the available RF spectrum in the regulated RF spectrum.

Wireless optical communication technologies, also referred to as free space optics, or FSO, have been recently proposed to avoid this available RF spectrum limitation. That is, the optical spectrum of FSO is not regulated, and is essentially immune to electromagnetic interference and capable of realizing vast transmission rates. One conventional FSO solution utilizes visible light-emitting diodes (LEDs) to directly modulate the LEDs (e.g., intensity-modulation direct-detection, or IM-DD), which offers simultaneous illumination and data transmission. However, the data rate that can be achieved by directly-modulated LEDs is very limited. To overcome this data rate limitation, lasers have been proposed as alternative optical light sources in IM-DD systems to achieve higher data rates than from using LEDs. Because such laser-based FSO systems have a much more limited field-of-view and link power budget, beam steering and tracking techniques, such as a phased array, have been utilized in the IM-DD FSO systems to minimize such limitations.

Such conventional beam steering/tracking techniques, however, do not provide sufficient beam alignment for coherent optical transmission systems. Coherent optical systems are capable of achieving significantly greater data transmission in comparison with IM-DD optical systems, but the coherent technologies utilize more highly sensitive receivers than IM-DD systems. Additionally, the greater optical/insertion loss experienced using coherent technologies render conventional optical beam alignment techniques unable to provide sufficient alignment control for coherent FSO operations. Accordingly, there is a need in this field to provide improved beam steering, alignment, and tracking techniques sufficient for coherent FSO transmissions.

SUMMARY

In an embodiment, a beam steering subsystem is provided in an optical communication system. The beam steering subsystem is configured for steering a free-space optical (FSO) beam from a first transceiver to a second transceiver disposed remotely from the first receiver. The beam steering subsystem includes a beam steering device disposed between the first transceiver and the second transceiver, and an optical tracking unit in optical communication and electrical communication with the beam steering device. The wherein the beam steering device is further configured to (i) receive the FSO beam from the first transceiver, (ii) receive an optical tracking signal from the second transceiver, (iii) optically relay the received optical tracking signal to the optical tracking unit, and (iv) steer the FSO beam to the second transceiver based on an electrical feedback control signal from optical tracking unit.

BRIEF DESCRIPTION

These and other features, aspects, and advantages of the present disclosure will become better understood when the following detailed description is read with reference to the following accompanying drawings, in which like characters represent like parts throughout the drawings, wherein.

Figure 1:
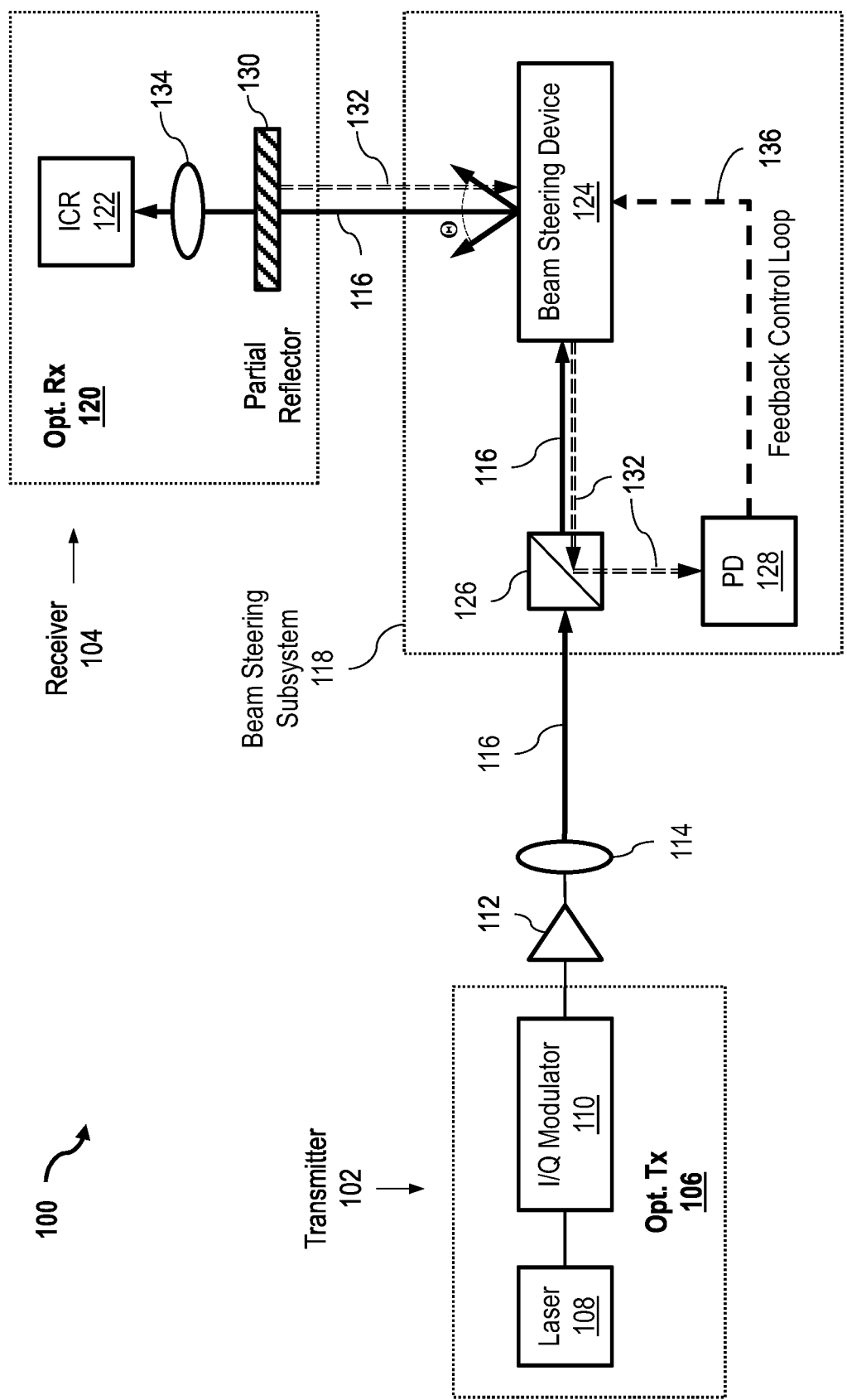
FIG. 1 is a schematic illustration depicting an exemplary point-to-point coherent optical transmission system, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "coherent transceiver," unless specified otherwise, refers to a P2P or P2MP coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The person of ordinary skill in the art will understand that the term "wireless," as used herein in the context of optical transmission and communications, generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and a "distance" between nodes may be physical or perceptual. A hyperscale datacenter may include several performance optimized datacenters (PODs), and each POD may include multiple racks and hundreds and thousands of compute and/or storage devices."

The embodiments described herein provide innovative architectures and techniques for FSO communication that are useful for achieving significantly improved dynamic position tracking and beam steering functionality. The present systems and methods are thus particularly advantageous, in comparison with conventional techniques, for FSO targeting in both indoor (e.g., data centers and/or hyperscalers) and outdoor (e.g., telecommunication) applications, as well as for both coherent and direct detection optical systems.

FIG. 1 is a schematic illustration depicting an exemplary point-to-point (P2P) coherent optical transmission system 100. In an exemplary embodiment, system 100 includes a transmitter portion 102 and a receiver portion 104 disposed downstream, remotely from transmitter portion 102. In the embodiment depicted in FIG. 1, transmitter portion 102 includes a coherent optical transmitter 106 having a laser source 108 and a modulator 110 (e.g., a coherent in-phase/quadrature (I/Q) modulator for the coherent optical paradigm) for modulating a data signal onto the light signal output from laser source 108. In some embodiments, coherent optical transmitter 106 may be contained within a single integrated circuit (IC) including both laser source 108 and I/Q modulator 110 within the same IC. In other embodiments, modulator 110 is external to laser source 108.

In an exemplary embodiment, transmitter portion 102 further includes an optical amplifier 112 for amplifying the modulated laser signal output from I/Q modulator 110. In at least one embodiment, optical amplifier 112 may be integrated into the same IC on which coherent optical transmitter 106 is fabricated. Alternatively, optical amplifier 112 may be separate from coherent optical transmitter 106. In exemplary operation, the amplified, modulated optical signal output from optical amplifier 112 is collimated by a collimator 114 (e.g., a fiber collimator), which converts the amplified, modulated optical signal into a free-space beam 116. In an exemplary embodiment, collimator 114 is integral to coherent optical transmitter 106. Alternatively, collimator 114 may be separately disposed from coherent optical transmitter 106 but configured to receive and convert the downstream optical signal output from optical amplifier 112.

In operation, free-space beam 116 carries the converted downstream coherent optical signal to a beam steering subsystem 118 interposed between transmitter portion 102 and receiver portion 104. In an exemplary embodiment, beam steering subsystem 118 dynamically targets a coherent optical receiver 120 of receiver portion 104 and steers free-space beam 116 to an integrated coherent receiver (ICR) 122 of coherent optical receiver 120 using a configurable beam steering device 124 of beam steering subsystem 118. In an embodiment, configurable beam steering device 124 may include an optical phase array, similar to some conventional beam steering devices. Different though, from the conventional techniques, beam steering subsystem 118 further includes a beam splitter/partial reflector 126 disposed between configurable beam steering device 124 and collimator 114, and also a photodetector 128 in optical communication with beam splitter/partial reflector 126 and in electrical communication with configurable beam steering device 124.

More particularly, in further exemplary operation, the respective components of coherent optical receiver 120 are configured to dynamically operate in coordination with relevant elements of beam steering subsystem 118. For example, upon receipt of free-space beam 116, beam splitter/partial reflector 126 allows the full optical power of free-space beam 116 to pass through beam splitter 126 and onto beam steering device 124, which then targets received free-space beam 116 toward coherent optical receiver 120.

At coherent optical receiver 120, and different from conventional techniques, a partial reflector 130 is disposed along the path of targeted free-space beam 116 between beam steering device 124 and ICR 122. At partial reflector 130, the substantial majority of free-space beam 116 passes through partial reflector 130 toward ICR 122, and a relatively small portion (e.g., less than 5-10 percent) of free-space beam 116 is reflected back toward beam steering device 124 as an optical reflection signal 132, which is transmitted along the same path from which free-space beam 116 is received, and at the same wavelength of the modulated optical signal of free-space beam 116. Accordingly, in the exemplary embodiment depicted in FIG. 1, free-space beam 116 is received by ICR 122 at greater than approximately 90-95 percent of the optical power level at which free-space beam 116 is received by and steered from beam steering device 124. In an exemplary embodiment, coherent optical receiver 120 further includes a focusing lens 134 disposed between partial reflector 130 and ICR 122 for coupling the optical signal of free-space beam 116 to ICR 122 for signal detection.

In the example illustrated in FIG. 1, partial reflector 130 is depicted as an element of coherent optical receiver 120. The person of ordinary skill in the art though, will comprehend that this depiction is provided for explanatory purposes, and is not intended to be limiting. For example, partial reflector 130 may be a separate component from coherent optical receiver 120.

In further exemplary operation of system 100, being steering device 124 receives optical reflection signal 132 from partial reflector 130 of coherent optical receiver 120, and then steers the received optical reflection signal 132 toward beam splitter/partial reflector 126. At beam splitter/partial reflector 126, the partial reflector portion thereof reflects optical reflection signal 132 toward photodetector 128, which in turn generates a control signal 136 that is sent to beam steering device 124 on a feedback control loop. In this manner, beam steering device 124 is advantageously enabled to utilize optical reflection signal 132 as a tracking signal to locate the position of coherent optical receiver 120. In an exemplary embodiment, beam steering device 124 is advantageously enabled to track, using control signal 136 from photodetector 128, receiver movement of coherent optical receiver 120.

For example, when coherent optical receiver 120 is moving, beam steering device 124 is configured to dynamically begin scanning across its tuning range, and thus track the position of coherent optical receiver 120 based on reflected signal strength of optical reflection signal 132 on photodetector 128. Further to this example, when coherent optical receiver 120 stops moving, beam steering device 124 is configured such that it may then lock to a targeting position where photodetector 128 detects a maximum signal strength (e.g., a peak value across the scanning range). Accordingly, using the dynamic feedback control technique of beam steering subsystem 118, the present embodiments achieve a significantly greater level of alignment control than may be realized according to conventional techniques.

Thus, even in the case where conventional hardware (e.g., an optical phase array) is utilized with beam steering device 124, precision alignment control may be achieved in a level sufficient for transmission and reception of coherent FSO signals. Additionally, the advantageous feedback techniques of beam steering subsystem 118 further enable beam steering device 124 to utilize a wider variety of optical components of various quality and cost levels, including but not limited to, optical phase arrays, liquid crystal arrays, tunable grating-lenses, micro-electromechanical system (MEMS) mirrors, etc. Accordingly, the present systems and methods are not only of particularly advantageous use with respect to coherent optical systems; the principles described herein may also be applied to IM-DD optical systems (described further below with respect to FIGS. 4-6) to enable greater versatility and cost savings or the beam steering-alignment control hardware used therefor.

According to the exemplary embodiment described above with respect to FIG. 1, implementation of partial reflector 130 at receiver portion 104 results in some reduction of the received optical signal power. This reduction in optical signal power may, in some cases, undesirably affect the power budget and/or reduce the optical signal to noise ratio (OSNR) of the receiver. In an alternative embodiment, which avoids this optical signal power reduction, is described further below with respect to FIG. 2.

Figure 2:
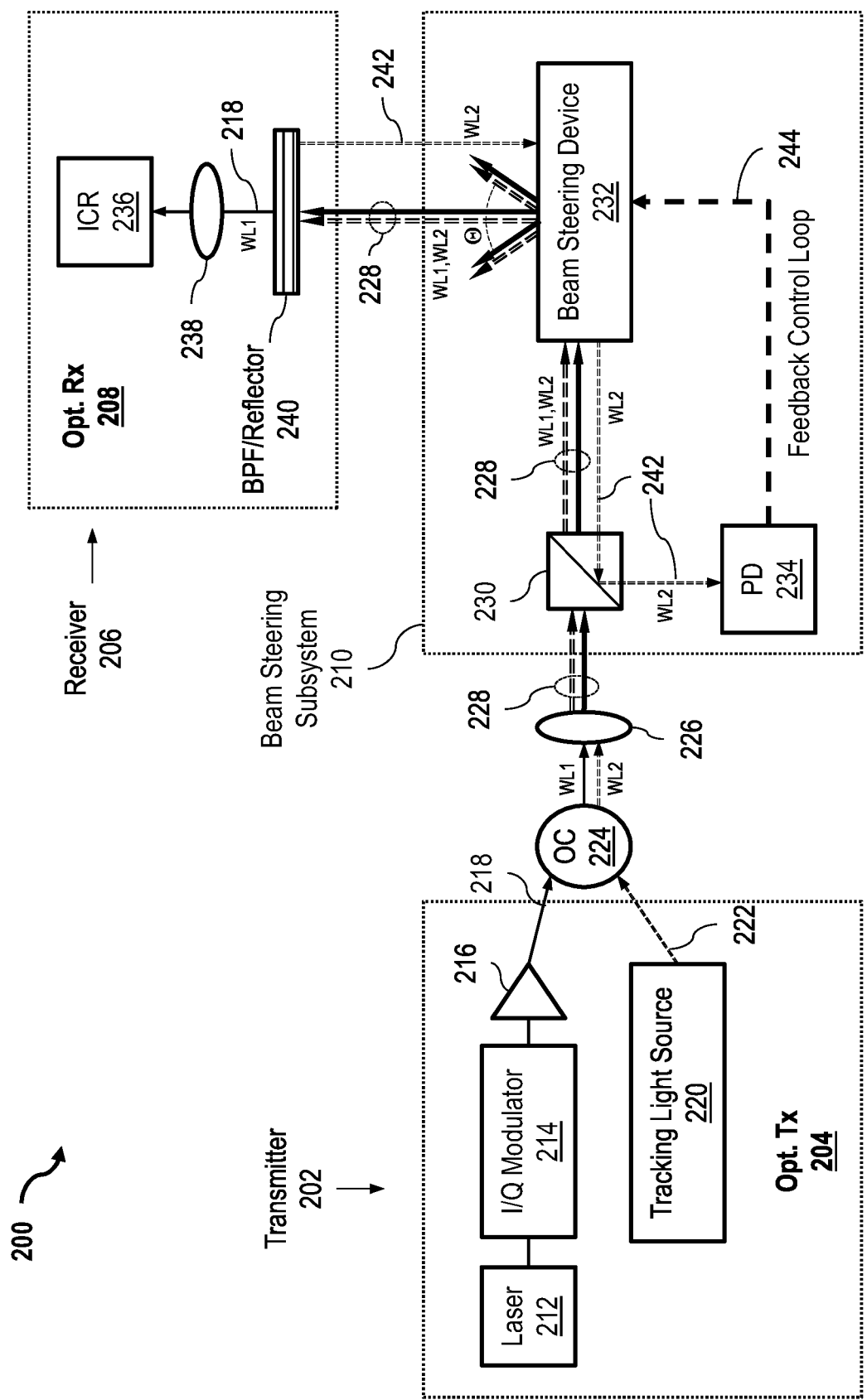
FIG. 2 is a schematic illustration depicting an alternative point-to-point coherent optical transmission system, in accordance with an embodiment.

FIG. 2 is a schematic illustration depicting an alternative P2P coherent optical transmission system 200. System 200 is similar, in several structural and functional aspects, to system 100, FIG. 1, and therefore uses similar labels for the respective components thereof. Accordingly, similar to system 100, system 200 includes a transmitter portion 202 including at least one coherent optical transmitter 204, a receiver portion 206 including at least one coherent optical receiver 208, and a beam steering subsystem 210 disposed therebetween. Different though, from system 100, system 200 implements a two-wavelength technique for signal transmission and tracking, respectively.

More particularly, in the embodiment depicted in FIG. 2, similar to coherent optical transmitter 106, FIG. 1, coherent optical transmitter 204 includes a laser source 212, an I/Q modulator 214, and an optical amplifier 216, which collectively operate to output and amplified modulated coherent optical data signal 218 at a first optical wavelength (WL1). In this embodiment though, coherent optical transmitter 204 additionally includes a separate tracking light source 220 for generating a tracking light signal 222 at a second optical wavelength (WL2) different from the first optical wavelength. An optical coupler 224 (e.g., a broadband optical coupler (OC)) is disposed between coherent optical transmitter 204 and beam steering subsystem 210, and which functions to combine optical data signal 218 and tracking light signal 222, and feed the combined WL1/WL2 signals to a collimator 226 (e.g., a fiber collimator) disposed between optical coupler 224 and beam steering subsystem 210, which converts and collimates the combined signal into a free-space beam 228 containing both optical signals, and including both wavelengths, respectively.

Beam steering subsystem 210 then functions similarly to beam steering subsystem 118, FIG. 1, with respect to the processing and steering of free-space beam 228 toward coherent optical receiver 208. That is, in the example depicted in FIG. 2, beam steering subsystem 210 includes a beam splitter/partial reflector 230, a configurable beam steering device 232, and a photodetector 234. In operation, beam splitter 230 relays the full free-space beam 228 to beam steering device 232, which in turn targets free-space beam 228 toward coherent optical receiver 208. In this exemplary embodiment, coherent optical receiver 208 is substantially similar to coherent optical receiver 120, FIG. 1, and includes an ICR 236 and a focusing lens 238. Coherent optical receiver 208 differs from coherent optical receiver 120 though, in that instead of a partial reflector, coherent optical receiver 208 includes a bandpass filter (BPF)/reflector 240 disposed between beam steering device 232 and focusing lens 238 along the path of free-space beam 228.

In further exemplary operation of system 200, BPF/reflector 240 is configured to allow passage of the first wavelength of optical data signal 218, but reflect the second wavelength of tracking light signal 222. Accordingly, at the BPF/reflector 240, the optical data signal portion of free-space beam 228 will pass through the BPF at substantially the full transmission power of optical data signal 218 and then coupled to ICR 236 through focusing lens 238 for signal detection, whereas the tracking signal portion of free-space beam 228 is reflected back to beam steering device 232 as an optical reflection signal 242 along the same beam path as free-space beam 228. It may be noted that tracking light signal 222 may be configured to utilize a significantly lower optical power level than optical data signal 218, such that the substantial majority of optical power is reserved for the transfer and transmission of data from optical data signal 218. The optical power of tracking light signal 222 need only have sufficient strength such that a peak value of optical reflection signal 242 is readily detectable by photodetector 234 across the scanning range of beam steering device 232.

At beam steering device 232, optical reflection signal 242, at the second wavelength WL2, is coupled to photodetector 234 by the partial reflector portion of beam splitter/partial reflector 230. Similar to the operation of beam steering subsystem 118, FIG. 1, photodetector 234 provides a control signal 244 to beam steering device 232 to track receiver movement. Thus, as an alternative to using a portion of the single-wavelength data signal itself for position tracking and alignment (e.g., system 100), system 200 features an independent tracking light that advantageously enables more signal power of the original laser source (e.g., laser 212) to be coupled into the receiver (e.g., ICR 236). Accordingly, the same architectural beam steering subsystem may be advantageously employed for either embodiment, irrespective of whether the optical reflection signal shares the same wavelength as the optical data signal or is separated on a different wavelength as an independent tracking signal.

The selection of one embodiment over the other may then be based upon the power budget and OSNR of the particular system in which the beam steering subsystem is employed, but without a need for structural modifications to the beam steering subsystem. Indeed, it is contemplated that the techniques of both of systems 100, 200 may be employed simultaneously, and the beam steering device equally enabled to achieve the improved beam alignment control herein irrespective of the wavelength of the received reflected optical signal.

Some additional structural modifications though, are considered to adapt the FSO beam alignment principles described above to the emerging technologies provided by full duplex (FDX) bidirectional coherent optical communication systems. An exemplary embodiment of the present beam steering techniques for the coherent FDX paradigm is described further below with respect to FIG. 3.

Figure 3:
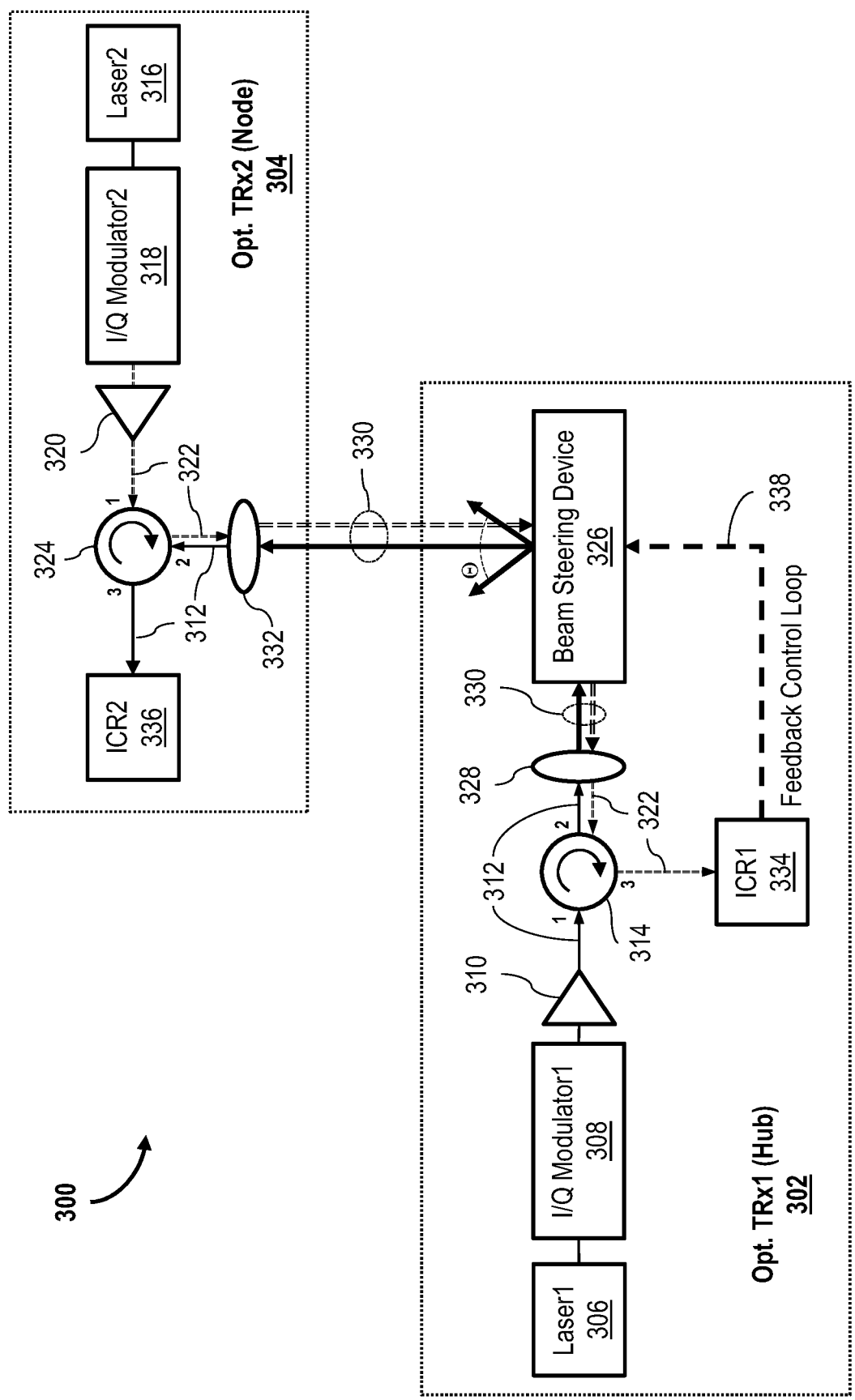
FIG. 3 is a schematic illustration depicting an exemplary bidirectional coherent optical transmission system, in accordance with an embodiment.

FIG. 3 is a schematic illustration depicting an exemplary bidirectional coherent optical transmission system 300. More particularly, in the embodiment depicted in FIG. 3, system 300 is a coherent FDX system including a first coherent transceiver 302 and a second coherent transceiver 304. That is, different from the more general transmitter/receiver architectures described above with respect to FIGS. 1 and 2, coherent FDX system 300 is agnostic to "upstream" and "downstream" directionality between first and second coherent transceivers 302, 304, since both of coherent transceivers 302, 304 in the FDX paradigm, both transmit and receive at the same single optical wavelength as the other transceiver.

In an exemplary embodiment, first coherent optical transceiver 302 includes a first laser source 306, a first I/Q modulator 308, and a first optical amplifier 310, which collectively operate to generate a first modulated optical data signal 312 at a particular optical frequency, similar to the embodiments described above, which is then sent to a first optical coupler 314 (e.g., received at port1 of a 3-port optical coupler). In a similar fashion, second coherent optical transceiver 304 includes a second laser source 316, a second I/Q modulator 318, and a second optical amplifier 320, which collectively operate to generate a different, second optical data signal 322, but at the same particular optical frequency of first optical data signal 312. Second optical data signal 322 is then received by a second optical coupler 324 (e.g., also at the respective port1 of a 3-port optical coupler).

In the exemplary embodiment depicted in FIG. 3, a configurable beam steering device 326 is integrally coupled with first coherent optical transceiver 302, and configured to indirectly receive first optical data signal 312 from first optical coupler 314 (e.g., from port2) after first optical data signal 312 passes through a first collimator 328 (e.g., a fiber collimator), which collimates and converts first optical data signal 312 into a free-space beam 330. In a similar manner, beam steering device 326 is further configured to indirectly receive second optical data signal 322 from the remote second optical coupler 324 (e.g., also from port2 thereof) after second optical data signal 322 passes through a second collimator 332 (e.g., also a fiber collimator), which collimates and converts second optical data signal 312 into the same free-space beam 330. Free-space beam 330 thus contains both optical data signals 312, 322, which are both simultaneously transmitted bidirectionally along the same path, and on the same optical wavelength. In this embodiment, first coherent transceiver 302 further includes a first ICR 334 for receiving second optical data signal (e.g., post-first collimator 328), and second coherent transceiver 304 further includes a second ICR 336 for receiving first optical data signal 312 (e.g., post-second collimator 332).

In exemplary operation, beam steering device 326 is advantageously enabled to perform position tracking of second coherent optical transceiver 304 using the "upstream" signal from that particular transceiver. That is, instead of a reflected signal or tracking beam for position tracking, beam steering device 326 is configured such that second optical data signal 322 may itself be utilized to generate a feedback control loop, similar to the embodiments above, for tracking the position of second coherent optical transceiver 304 by first coherent optical transceiver 302. For the purposes of this description, the terms "upstream" and "downstream" are relative terms; these terms are therefore described further herein from the perspective of first coherent optical transceiver 302, which includes the integrated beam steering device 326. From this exemplary perspective, first optical data signal 312 may be correctly designated the "downstream signal" and second optical data signal 322 may be correctly designated the "upstream signal."

Additionally, by way of example and not in a limiting sense, first coherent optical transceiver 302 is designated as a Hub transceiver, which may be, include, or cooperate with a coherent optical transceiver device such as an optical line terminal (OLT) (not separately shown). In a similar manner, second optical transceiver 304 is designated, for purposes of this description, as a Node transceiver, and may be, include, or cooperate with the coherent optical transceiver devices such as an optical network unit (ONU) (also not separately shown). The person of ordinary skill in the art will understand that other devices and/or structural configurations may be implemented without departing from the scope herein.

In exemplary operation of system 300, on the Hub side, the downstream signal (e.g., first optical data signal 312) is routed to the remote transceiver (e.g., second coherent optical transceiver 304) by way of beam steering device 326, after the downstream signal is first converted into a free-space beam (e.g., free-space beam 330). On the Node side, the free space beam may be coupled into a fiber medium by a fiber collimator (e.g., second collimator 332), and then routed to a receiver portion (e.g., second ICR 336) of the node transceiver by an optical circulator (e.g., second optical circulator 324, received at port2 and output at port3) of that node. In a similar manner, the same Node optical circulator (e.g., second optical circulator 324) additionally functions to route the upstream signal (e.g., second optical data signal 322) back to the Hub via the same path (e.g., received at port1 and output at port2) of the free-space beam to beam steering device 326 at the Hub transceiver.

Back at the Hub side of system 300, the upstream signal (e.g., second optical data signal 322) is coupled into a receiver portion (e.g., first ICR 334) of the Hub side by way of the Hub optical circulator (e.g., received from first collimator 328 at port2 of first optical circulator 314 and output to first ICR 334 from port3). Different from the embodiments described above, the Hub receiver (e.g., first ICR 334) itself may be configured and/or programmed to provide a control signal 338 to beam steering device 326 along a feedback control loop similar to those described above. That is, in an exemplary embodiment, first ICR 334 may be advantageously configured to perform all of the functionality, described above, with respect to photodetectors 128, 234, FIGS. 1, 2, respectively, in addition to the other functional operations that may be performed by an ICR device.

Thus, according to the exemplary principles described with respect to FIG. 3, a Hub coherent transceiver is advantageously enabled to track Node side movement of a Node coherent transceiver and with significantly improved precision alignment control to enable tracking of the more sensitive and complex coherent optical signals. The innovative techniques provided according to system 300 thus unable sufficient FSO beam alignment capability transmission for not only either of an upstream or downstream transmission; the techniques of system 300 further also realize these improved beam alignment advantages even in the case of coherent full-duplex (FDX) transmission, namely, a coherent optical transmission system that bidirectionally transports both of the "upstream" and "downstream" transmission signals using same single wavelength and same path.

Systems and methods employing the principles illustrated in, and described with respect to, FIG. 3 further advantageously avoid excess loss that may be introduced to the respective optical signals by the intervention of personal reflectors and/or bandpass filters. Moreover, as can be seen with respect to system 300, the structural configuration of the "beam steering subsystem" is greatly simplified, for example, in comparison with systems 100, 200, FIGS. 1, 2, respectively. According to the architectural configuration depicted in FIG. 3, a beam steering device (e.g., beam steering device 326) may be advantageously integrated with one of the two bidirectional transceivers, thereby lemonade in the need for additional hardware components, such as beam splitters, partial reflectors, photodetectors, or bandpass filters. The functionality of these additional hardware components may be sufficiently achieved in the exemplary FDX system using several hardware elements already present in, or inexpensively added to, both coherent optical transceivers.

It may be noted though, that the innovative principles described above with respect to system 300 are not limited to the coherent single-wavelength FDX paradigm (e.g., using a local oscillator (not shown) tuned to the local signal); the advantageous beam alignment control results achieved according to system 300 may also be fully realized with respect to a non-FDX bidirectional coherent transmission system having two remote receivers transmitting their respective optical data signals on two different wavelengths, respectively. System 300 is expected to realize the same significantly improved beam alignment control in such cases, and without requiring significant modifications, if any, to the structural configuration of the system. In this alternative scenario, the Hub receiver portion (e.g., first ICR 334) may be simply configured to scan for peak values of the upstream Node signal (e.g., second optical data signal 322) at a second wavelength corresponding to that remotely-transmitted Node signal.

Figure 5:
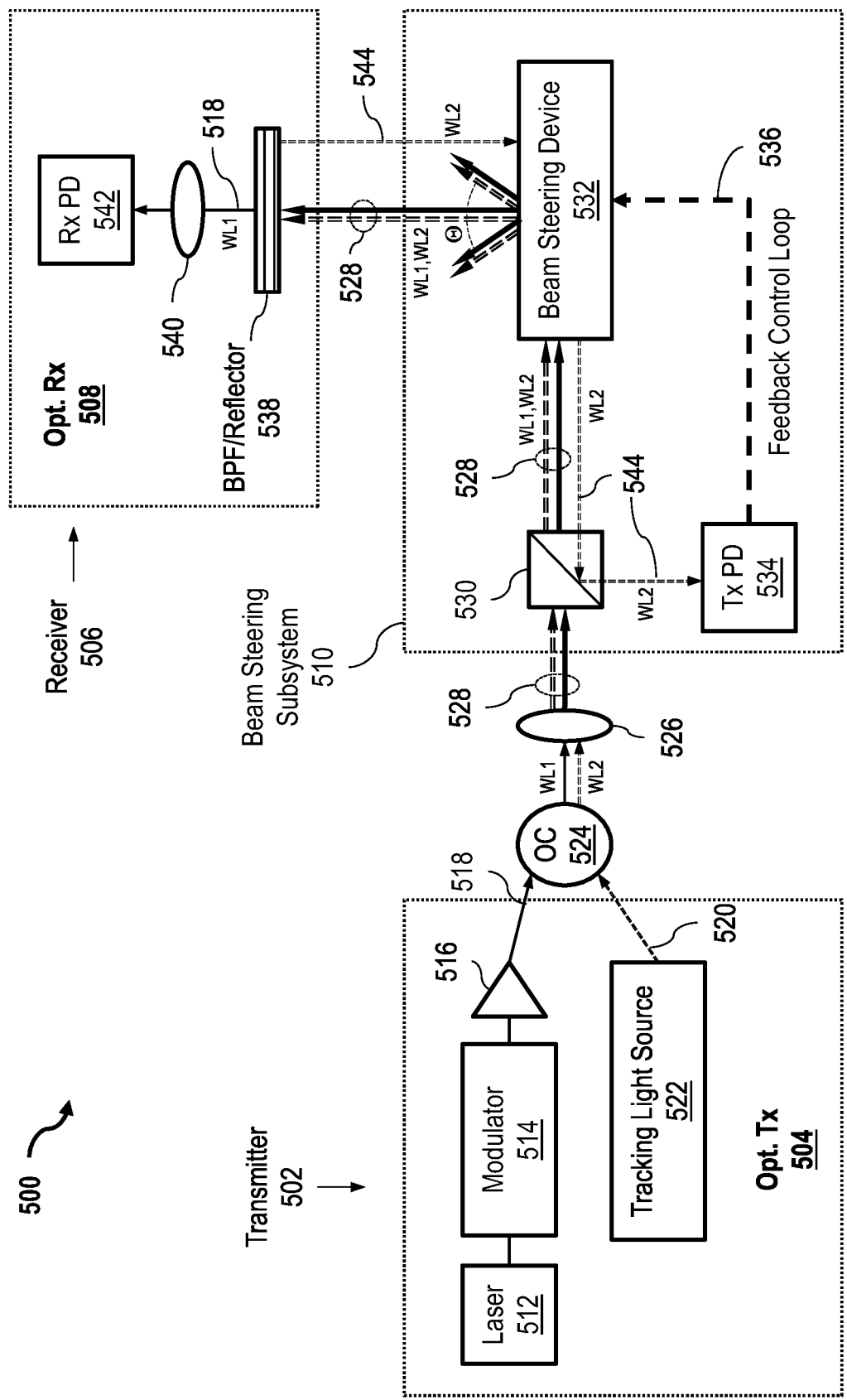
FIG. 5 is a schematic illustration depicting an alternative point-to-point direct detection optical transmission system, in accordance with an embodiment.
Figure 6:
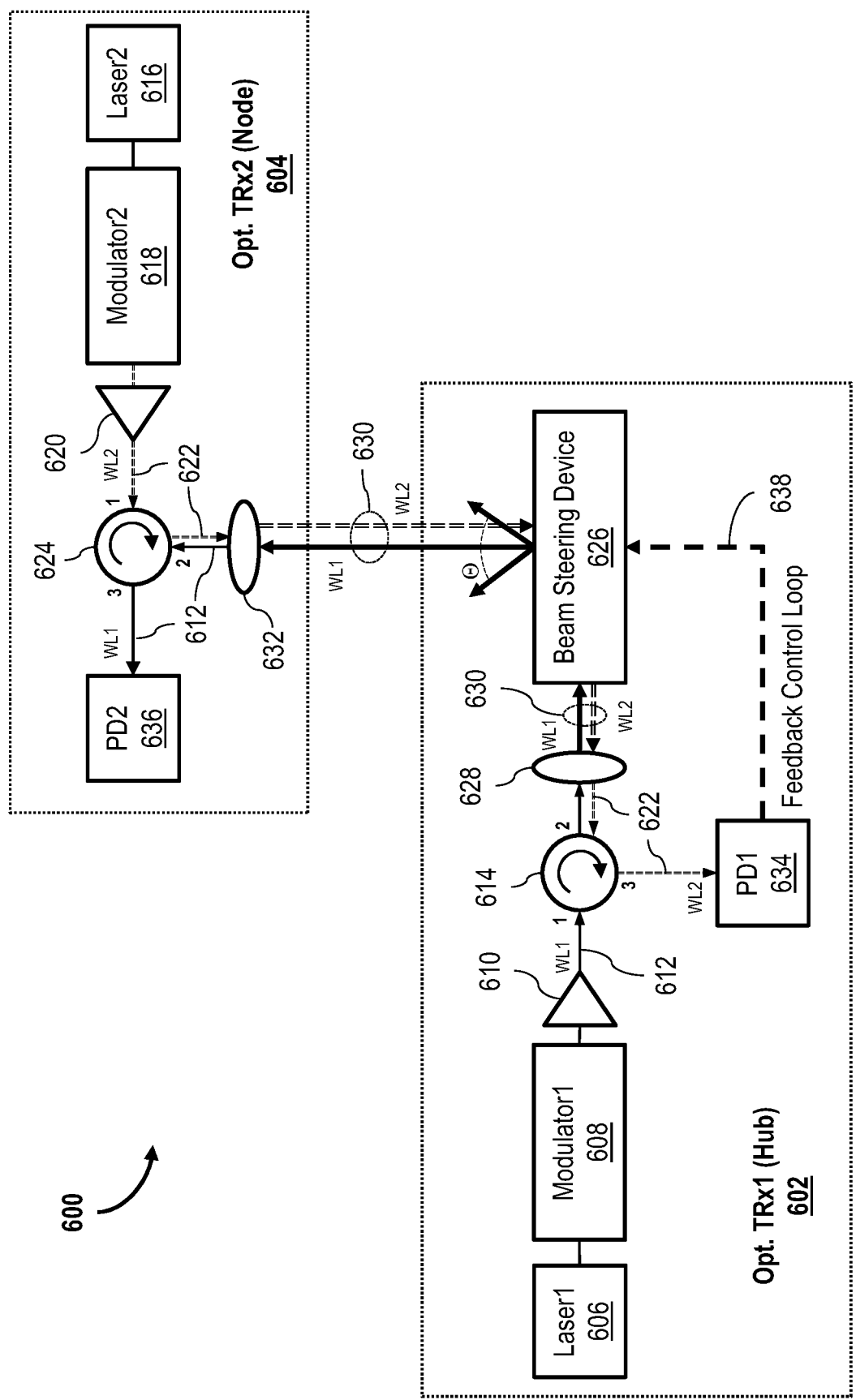
FIG. 6 is a schematic illustration depicting an exemplary bidirectional direct detection optical transmission system, in accordance with an embodiment.

The foregoing embodiments are described with respect to the coherent optical paradigm, for which high-precision beam alignment control is of much greater concern when compared with the direct detection (e.g., IM-DD) optical paradigm. As described above, beam alignment control is a much more significant challenge in the coherent paradigm, due to the much greater sensitivity of coherent receivers, as well as the substantially greater amounts of optical/insertion loss for coherent optical signals. Nevertheless, the person of ordinary skill the art will appreciate, after reading and comprehending the present written description and associated drawings, that the improved beam alignment control techniques described above will also provide particular advantages when adapted to the direct detection paradigm. That is, even though high-precision beam alignment control is not considered as great challenge in direct detection optical transmission systems, the improvements realized according to the present embodiments render even such direct detection beam alignment techniques more versatile to a wider variety of beam alignment devices, and particularly less costly types of such devices. Accordingly, the following description with respect to FIGS. 4-6 represents application of the systems and methods described above with respect to FIGS. 1-3, respectively, but adapted for exemplary operations within the direct detection paradigm.

Figure 4:
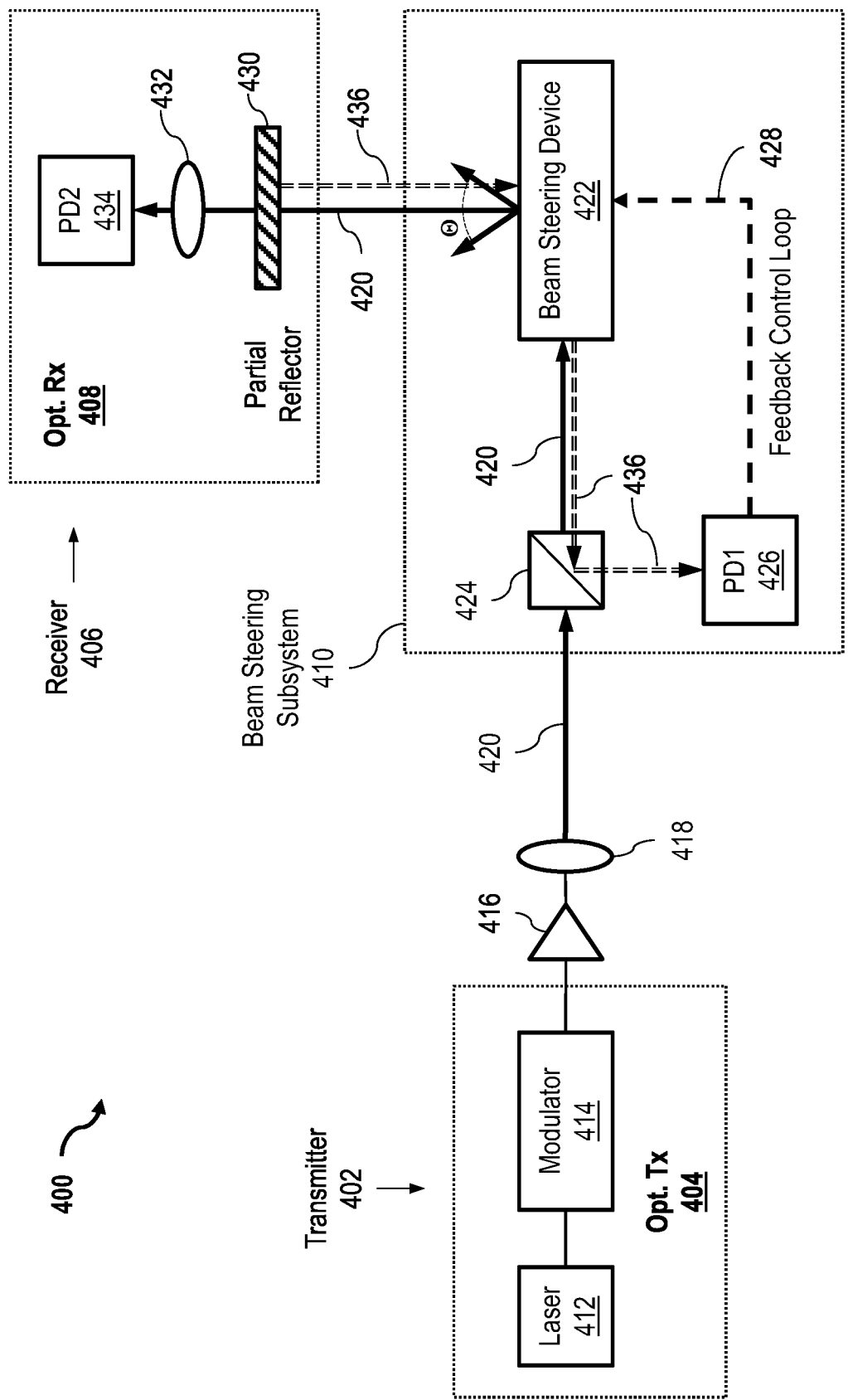
FIG. 4 is a schematic illustration depicting an exemplary point-to-point direct detection optical transmission system, in accordance with an embodiment.

FIG. 4 is a schematic illustration depicting an exemplary P2P direct detection optical transmission system 400. Direct detection system 400 is similar, in many structural and functional aspects, to coherent system 100, FIG. 1, and includes a transmitter portion 402 having an optical transmitter 404, a receiver portion 406 having an optical receiver 408, and a beam steering subsystem 410 disposed therebetween. Optical transmitter 404 is similar to coherent optical transmitter 106, FIG. 1, and includes a laser source 412, but differs by utilizing an external modulator 414 instead of an I/Q modulator. Optical transmitter 404 though, is otherwise similar to coherent optical transmitter 106, in that the modulated optical signal output from external modulator 414 is amplified by an optical amplifier 416, and then collimated by a collimator 418 into a free-space optical signal 420.

Beam steering subsystem 410 is substantially similar to beam steering subsystem 118, FIG. 1, and includes a configurable beam steering device 422, a beam splitter/partial reflector 424, and a first photodetector 426 (e.g., transmitter-side) configured to provide a control signal 428 to beam steering device 422. Optical receiver 408 is similar to coherent optical receiver 120, FIG. 1, and includes a partial reflector 430 and a focusing lens 432, but differs by utilizing second photodetector 434 (e.g., receiver-side) instead of an ICR. Optical receiver 408 though, is otherwise similar to coherent optical transmitter 106, in that partial reflector 430 reflects a small portion (e.g., less than 5-10 percent) of free-space optical signal 420 back to beam steering device 422 as an optical reflection signal 436. Beam steering device 422 then receives, and beam steering subsystem 410 then processes, optical reflection signal 436 in a manner similar to that described above with respect to beam steering subsystem 118 and optical reflection signal 132, FIG. 1.

According to this adaptation of the innovative configuration, in addition to significantly higher precision beam alignment control capability, beam steering subsystem 410 is advantageously enabled to utilize a wider variety of optical components for beam steering device 422 (e.g., optical phase arrays, liquid crystal arrays, tunable grating-lenses, micro-electromechanical system (MEMS) mirrors, etc.), and thus realize significant cost savings according to the greater design versatility provided by the present systems and methods.

FIG. 5 is a schematic illustration depicting an alternative P2P direct detection optical transmission system 500. System 500 is similar, in many structural and functional aspects, to system 200, FIG. 2, and includes a transmitter portion 502 including at least one optical transmitter 504, a receiver portion 506 including at least one optical receiver 508, and a beam steering subsystem 510 disposed therebetween.

Optical transmitter 504 is similar to coherent optical transmitter 204, FIG. 2, and includes a laser source 512, but differs by utilizing an external modulator 514 instead of an I/Q modulator. Optical transmitter 504 though, is otherwise similar to coherent optical transmitter 204, in that the modulated optical signal output from external modulator 514 is amplified by an optical amplifier 516 into an amplified modulated optical data signal 518 at a first optical wavelength (WL1), which is combined with a separate tracking light signal 520 at a second optical wavelength (WL2), from an independent tracking light source 522, at an optical coupler 524 (e.g., a broadband OC) disposed between optical transmitter 504 and beam steering subsystem 510. Optical coupler 524 also similarly feeds the combined WL1/WL2 signals to a collimator 526 (e.g., a fiber collimator) disposed between optical coupler 524 and beam steering subsystem 510, which converts and collimates the combined signal into a free-space beam 528 containing both optical signals, and including both wavelengths, respectively.

Beam steering subsystem 510 is thus substantially similar to beam steering subsystem 210, FIG. 2, and includes a beam splitter/partial reflector 530, a configurable beam steering device 532, and a first photodetector 534 (e.g., transmitter-side) configured to provide a control signal 536 to beam steering device 532. Optical receiver 508 is similar to coherent optical receiver 208, FIG. 2, and includes a BPF/reflector 538 and a focusing lens 540, but differs by utilizing second photodetector by 42 (e.g., receiver-side) instead of an ICR. Optical receiver 508 though, is otherwise similar to coherent optical transmitter 208, in that BPF/reflector 538 reflects passes the first wavelength corresponding to optical data signal 518 through two second photodetector 542, but reflects at least a portion of the second wavelength corresponding to tracking light signal 520 from free-space optical signal 528 back to beam steering device 532 as an optical reflection signal 544. Beam steering device 532 then receives, and beam steering subsystem 510 then processes, optical reflection signal 544 in a manner similar to that described above with respect to beam steering subsystem 210 and optical reflection signal 242, FIG. 2.

FIG. 6 is a schematic illustration depicting an exemplary bidirectional direct detection optical transmission system 600. System 600 is similar, in many structural and functional aspects, to system 300, FIG. 3, and includes a first optical transceiver 602 (e.g., an "upstream" Hub transceiver, from the Hub perspective) and a remotely-located second optical transceiver 604 (e.g., a "downstream" Node transceiver, again from the Hub perspective).

First optical transceiver 602 is similar to first coherent optical transceiver 302, FIG. 3, and includes a first laser source 606, but differs by utilizing a first external modulator 608 instead of an I/Q modulator. First optical transceiver 602 though, is otherwise similar to first coherent optical transceiver 302, in that the modulated optical signal output from first external modulator 608 is amplified by a first optical amplifier 610 to produce a first modulated optical data signal 612 at a first optical wavelength (WL1), which is then sent to a first optical coupler 614 (e.g., at port1). Second optical transceiver 604 is similar to second coherent optical transceiver 304, FIG. 3, and includes a second laser source 616, but also differs by utilizing a second external modulator 618 instead of an I/Q modulator. Second optical transceiver 604 though, is otherwise similar to second coherent optical transceiver 304, in that the modulated optical signal output from second external modulator 618 is amplified by a second optical amplifier 620 to produce a second modulated optical data signal 622 at a second optical wavelength (WL2), which is then sent to a second optical coupler 624 (e.g., at port1 thereof).

First optical transceiver 602 is further substantially similar to first coherent optical transceiver 302 with respect to integration of a feedback control-based beam steering subsystem. That is, in an exemplary embodiment, first optical transceiver 602 further includes an integrated configurable beam steering device 626 and a first collimator 628 configured to receive and steer a free-space beam 630 that includes the first WL1 optical signal collimated by first collimator 628 (e.g., disposed Hub-side), as well as the WL2 optical signal collimated by a second collimator 632 (e.g., disposed Node-side), with both of the two different wavelengths being transmitted and received over the same FSO signal path. System 600 differs though, from system 300, in that the receiver portion of first optical transceiver 602 includes a first photodetector 634 instead of an ICR, and the receiver portion of second optical transceiver 604 includes a second photodetector 636 instead of an ICR.

With respect to beam steering feedback control functionality, on the other hand, the Hub-side first photodetector 634 is configured to provide a control signal 638 to beam steering device 626 along a feedback control loop similar to the embodiments described above. In this respect, the systems and techniques provided according to the embodiment depicted in FIG. 6 are substantially the same as the two-wavelength alternative embodiment described above with respect to system 300, FIG. 3, except for the substitution of photodetectors 634, 636 in place of ICRs 334, 336, respectively. Additionally, as described above, the particular optical elements and/or hardware used for beam steering device 626 may be selected from lower-precision and/or lower-cost alternatives in the direct detection paradigm, than may be preferred for the coherent paradigm.

According to the innovative systems and methods described above, several advantageous techniques and architectures are provided for improved FSO transmission and beam alignment control. The present embodiments are further advantageous, in comparison with conventional techniques, in that the systems and methods described herein are fully applicable to both indoor and outdoor applications, and are easily scalable. The embodiments herein are thus of particular use for that only traditional telecommunication operations, but also of great value with respect to the emerging technologies and large-scale increases to the emerging paradigms of data centers and hyperscalers.

The systems and methods described herein are therefore also of particular advantageous use with respect to the optical access network paradigm, for example, in the cable environment or other telecommunication applications, and may be implemented with respect to 4G, 5G, and 6G networks and related technologies, as well as fronthaul, backhaul, and midhaul deployments, and also for both short- and long-haul architectures, where FSO implementation may be desirable to substitute for, or supplement, wired portions of the respective architectures. The innovative FSO techniques of the present embodiments thus provide a unique fixed solution to traditional wired communication systems where FSO implementation may represent a last costly expenditure than laying new optical fibers over significant distances. The present embodiments still further offer unique temporary or backup solutions to existing wired communication systems where, for example, a transmission line might be temporarily severed, and require time to fix.

The present embodiments are also of particular use with respect to hyperscale data centers, which typically house relatively massive computing infrastructures. These large computing infrastructures are known to consume massive amounts of energy and also discharge significant pollutants into the atmosphere, while also requiring significant thermal heating and cooling to ensure proper device and system operation. The FSO solutions described herein though, are scalable to such operations for the needed enhanced processing speeds of the large computing infrastructures, but without proportionally contributing to the pollution and thermal challenges experienced by existing hyperscale data centers. The present FSO solutions thus represent significant potential reductions to capital and operating expenditures of the rapidly expanding hyperscale data centers.

Exemplary embodiments of free-space optical systems and methods for communication networks are described above in detail. The systems and methods of this disclosure though, are not limited to only the specific embodiments described herein, but rather, the components and/or steps of their implementation may be utilized independently and separately from other components and/or steps described herein. Additionally, several of the embodiments discussed herein are described, for ease of explanation and not in a limiting sense, with respect to point-to-point (P2P) communication architectures. The person of ordinary skill the art is apprised that the present techniques may also be implemented with respect to point-to-multipoint (P2MP) architectures without departing from the scope herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A beam steering subsystem in an optical communication system, the beam steering subsystem configured for steering an initial free-space optical (FSO) beam from a first transceiver to a second transceiver disposed remotely from the first transceiver, the beam steering subsystem comprising:
   a beam steering device disposed between the first transceiver and the second transceiver; and
   an optical tracking unit in optical communication and electrical communication with the beam steering device,
   wherein the beam steering device is configured to:
      (i) receive, along a first FSO path directly linking the beam steering device and the first transceiver, the initial FSO beam from the first transceiver;
      (ii) steer the received FSO beam to the second transceiver along a second FSO path directly linking the beam steering device and the second transceiver;
      (iii) capture, along the second FSO path from the second transceiver, a reflected portion of the steered FSO beam;
      (iii) optically relay, to the optical tracking unit, the captured reflected portion as an optical tracking signal; and
      (iv) adjust steering of the steered FSO beam to the second transceiver based on an electrical feedback control signal from optical tracking unit, wherein the electrical feedback control signal is based on the optically-relayed optical tracking signal.

2. The beam steering subsystem of claim 1, wherein the optical tracking unit is configured to (i) scan the optical tracking signal over a tuning range of the beam steering device, and (ii) output the electrical feedback control signal to the beam steering device based on the scan of the optical tracking signal.

3. The beam steering subsystem of claim 2, wherein the optical tracking unit is configured to determine a peak value of the optical tracking signal within the scanned tuning range, and wherein the electrical feedback control signal is based on the determined peak value.

4. The beam steering subsystem of claim 3, wherein the beam steering device is further configured to lock on a position of the second transceiver based on the determined peak value.

5. The beam steering subsystem of claim 1, wherein the initial FSO beam includes a first optical data signal from the first transceiver on a first optical wavelength.

6. The beam steering subsystem of claim 5, wherein the optical tracking signal is included in the initial FSO beam received from the first transceiver.

7. The beam steering subsystem of claim 6, wherein the optical tracking signal shares the first optical wavelength with the first optical data signal.

8. The beam steering subsystem of claim 5, wherein the optical tracking signal is included in the initial FSO beam on a second optical wavelength different from the first optical wavelength.

9. The beam steering subsystem of claim 1, wherein the optical tracking signal includes a portion of a second optical data signal originating from the second transceiver.

10. The beam steering subsystem of claim 9, wherein the first and second optical data signals are coherent optical transmissions.

11. The beam steering subsystem of claim 10, wherein the optical communication system includes a full duplex (FDX) coherent optical network.

12. The beam steering subsystem of claim 11, wherein the first and second optical data signals share a same optical wavelength.

13. The beam steering subsystem of claim 10, wherein the optical tracking unit comprises an integrated coherent receiver.

14. The beam steering subsystem of claim 10, wherein the optical tracking unit comprises a photodetector.

15. The beam steering subsystem of claim 9, wherein the first optical data signal occupies a first optical wavelength and second optical data signal occupies a second optical wavelength different from the first optical wavelength.

16. The beam steering subsystem of claim 15, wherein the first and second optical data signals are direct detection-based optical transmissions.

17. The beam steering subsystem of claim 1, wherein the beam steering device comprises at least one of an optical phase array, a liquid crystal array, a tunable grating-lens, and a micro-electromechanical system (MEMS) mirror.

18. The beam steering subsystem of claim 1, further comprising a beam splitter and partial reflector disposed between the beam steering device and the optical tracking unit along the second FSO path.

19. The beam steering subsystem of claim 18, wherein the partial reflector is configured to (i) pass the steered FSO beam directly to the second transceiver along the second FSO path, and (ii) reflect the reflected portion directly back to the beam steering device along the second FSO path.

20. The beam steering subsystem of claim 19, wherein the beam splitter and partial reflector is disposed proximate the second transceiver.

21. The beam steering subsystem of claim 19, wherein the beam steering device is further configured to dynamically adjust the steered FSO beam.

* * * * *